United States Patent Office 3,381,020
Patented Apr. 30, 1968

3,381,020
PERFLUOROCARBYLTHIOBENZOQUINONES AND HYDROQUINONES AND RELATED SULFOXY AND SULFONYL BENZOQUINONES AND HYDROQUINONES
Richard M. Scribner, Wilmington, Del., assignor to E. I. du Pont de Nemours and Company, Wilmington, Del., a corporation of Delaware
No Drawing. Filed May 1, 1963, Ser. No. 277,135
17 Claims. (Cl. 260—396)

ABSTRACT OF THE DISCLOSURE

Perfluorocarbylthiohydroquinones produced by the base-catalyzed reaction of a perfluorocarbylosulfenyl halide with selected hydroquinones or by the base-catalyzed reaction of a perfluorocarbyl mercaptan and selected benzoquinones and perfluorocarbylthiobenzoquinones produced by controlled oxidation of the corresponding hydroquinones are claimed. Their sulfoxy and sulfonyl derivatives produced by oxidation of the corresponding derivative are also claimed. The products are useful either as high energy fuels or as strong oxidizing agents.

---

This invention relates to a new class of perfluorocarbylthiobenzoquinones, the corresponding sulfoxy and sulfonyl perfluorocarbylquinones, and the corresponding hydroquinones and hydroquinone ethers and esters of these perfluorocarbylthiobenzoquinones and of their sulfoxy and sulfonyl derivatives.

The new products of this invention can be described by the following structural formulas:

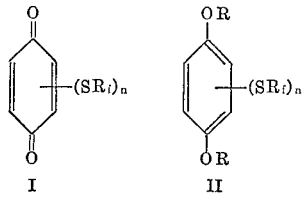

where R is hydrogen, alkyl, aryl, aralkyl, alkaryl, cycloalkyl, hydrocarbyl monoacyl, or perfluorohydrocarbyl monoacyl of no more than 8 carbons each; $R_f$ is perfluorohydrocarbyl of no more than 8 carbons, and preferably lower perfluoroalkyl of 1–3 carbons; and $n$ is an integer from 1–4, inclusive. These new products are easily prepared by the metathesis of the requisite perfluoroalkanesulfenyl halides and the necessary hydroquinone or hydroquinone ether, forming the desired perfluoroalkylthiohydroquinones or hydroquinone ethers, which on direct oxidation are easily converted to the desired perfluoroalkylthiobenzoquinones, which in turn can be converted to benzoquinones containing one more perfluoroalkylthio group by reaction with a perfluoroalkyl mercaptan and oxidation of the resulting hydroquinone.

The perfluoroalkylthiohydroquinone hydrocarbyl monoacyl esters and perfluorohydrocarbyl monoacyl esters, preferably the alkanoyl and perfluoroalkanoyl esters, are made directly from the requisite hydroquinones and hydrocarbyl monoacyl or perfluorohydrocarbyl monoacyl acids, acid anhydrides, or acid halides. These perfluoroalkylthiohydroquinones and -quinones as a class, irrespective of the number of perfluoroalkylthio substituents, are characterized by an unusually high solubility in nonpolar organic solvents and also as a class are effective as antioxidants.

The following examples, in which the parts given are by weight, are submitted to illustrate further but not to limit this invention.

Example I

Into a spherical glass reactor of internal capacity corresponding to 2,000 parts of water, fitted with a magnetic stirrer, an internal gas inlet tube reaching almost to the bottom of the reactor, and an efficient solid carbon dioxide/acetone reflux condenser was charged 1,489 parts of chloroform, 200 parts of p-methoxyphenol, and 420 parts of pyridine (3.3 molar proportions based on the p-methoxyphenol). The resultant mixture was maintained at 0–5° C. with stirring by suitable application of an external ice/water bath while 490 parts of pure trifluoromethanesulfenyl chloride (B.P. −2° C.) was distilled from a cold trap into the reaction mixture over a period of about 2.5 hours. The mixture was then stirred for about 15 hours, cooled by the external ice/water bath for the first 1.5 hours, and after that left at room temperature, with solid carbon dioxide/acetone-cooling mixture being maintained in the reflux condenser for the first 6–8 hours. The chloroform solution was then extracted once with a solution of 420 parts of concentrated hydrochloric acid in 1,500 parts of water and then extracted with a solution containing 85 parts of the acid in 500 parts of water. The chloroform solution was then washed with water and dried over anhydrous magnesium sulfate. The chloroform was removed therefrom by evaporation under reduced pressure at temperatures not exceeding 50° C. The resultant crude 2,6-bis(trifluoromethylthio)-4-methoxyphenol was recrystallized from 500 parts of n-hexane. A first crop of crystals, weighing 180 parts and melting at 78–81° C., was obtained. A second crop, weighing 123 parts and melting at 70–77° C., was obtained by cooling the mother liquor in an ice/water bath. Recrystallization of the first crop from 400 parts of n-hexane afforded 136 parts of purified 2,6-bis(trifluoromethylthio)-4-methoxyphenol as colorless crystals melting at 82.3–84.0° C. On cooling the mother liquor from this second crystallization, 10–15 parts additional product was obtained which was combined with the above second crop, melting at 75–77° C., and sublimed to afford 90 parts of a white solid product, melting at 75–80° C. Recrystallization of this sublimate from about 200 parts of n-hexane afforded 73 parts of purified 2,6-bis(trifluoromethylthio)-4-methoxyphenol melting at 80–82° C. The total yield of product melting above 80° C. was 209 parts (40% of theory). An analytical sample was prepared by still further recrystallization of a sample of the crop melting at 82.3–84.0° C. The further purified product melted at 83.0–84.0° C.

*Analysis.*—Calcd. for $C_9H_6S_2O_2F_6$: C, 33.4%; H, 1.9%; S, 19.8%; F, 35.2%. Found: C, 33.7%; H, 2.1%; S, 19.9%; F, 34.9%.

When this preparation was carried out with less than 3.0 molar proportions of pyridine for each molar proportion of p-methoxyphenol, mixtures of the mono- and di-substituted products were obtained. Thus, when two molar proportions of pyridine, two molar proportions of trifluoromethanesulfenyl chloride, and one molar proportion of p-methoxyphenol were reacted as above, a solid mixture of products melting at 54–67° C. was obtained.

Analysis of this mixture by n-m-r showed it to contain about 40 mole-percent of 2-trifluoromethylthio-4-methoxyphenol and about 60 mole-percent of 2,6-bis-(trifluoromethylthio)-4-methoxyphenol. In $CDCl_3$ solution, the mono($CF_3S$—)substituted methoxyphenol exhibited a resonance peak ascribable to —$OCH_3$ at about 9.11τ (relative area 24); whereas the di($CF_3S$—)substituted methoxyphenol exhibited a corresponding peak at 1.9 cps. to lower field (relative area 36). Separation of the components of this mixture was accomplished by gas-phase chromatography over tricresylphosphate (20%) adsorbed on acid-washed firebrick. With a column temperature of 160° C. and a helium gas-flow rate of 120 cc./min., 2-trifluoromethylthio-4-methoxyphenol (37 mole-percent) came off the column after a retention time of 11.5 minutes, and 2,6-bis(trifluoromethylthio)-4-methoxyphenol (57 mole-percent) came off after a retention time of 15.0 minutes. Oxidation of the original mixture with nitric acid at 0° C. gave a mixture of 2-trifluoromethylthio-1,4-benzoquinone and 2,6-bis-(trifluoromethylthio)-1,4-benzoquinone, from which the latter was removed by sublimation at 100° C./0.3 mm.

Example II

A glass reactor of internal capacity corresponding to 500 parts of water, designed for efficient agitation, and fitted with a paddle stirrer, a reflux water condenser, a thermometer, and an external heating mantle was charged with 140 parts of concentrated (68%) nitric acid. With vigorous stirring, 50 parts of powdered 2,6-bis(trifluoromethylthio)-4-methoxyphenol was added in portions over a period of 20–35 minutes at such a rate that the reaction mixture was maintained at 30–35° C. with occasional external cooling. After the exothermic reaction from the last addition had subsided, the reaction mixture was heated over a period of 30 minutes to 50° C. and held there for 10–15 minutes, all with vigorous agitation. The mixture was then allowed to cool to room temperature and poured into an ice/water mixture. The resultant yellow solid was removed by filtration and washed on the filter with water until the washwater was no longer acidic. After being thoroughly air dried, the crude product was crystallized from boiling methylcyclohexane (8–9 parts per part of crude quinone) to afford, after drying, 46.5 parts (96% of theory) of pure 2,6-bis(trifluoromethylthio)-1,4-benzoquinone as bright yellow plates melting at 142.0–143.0° C. An analytical sample melting at 143.5–144.5° C. was obtained by sublimation at 90° C. under pressure corresponding to 10 mm. of mercury.

*Analysis.*—Calcd. for $C_8H_2F_6S_2O_2$: C, 31.1%; H, 0.6%; F, 37.0%; S, 20.8%. Found: C, 31.3%; H, 0.8%, F, 37.1%; S, 21.0%.

Example III

A solution of 3.1 parts of 2,6-bis(trifluoromethylthio)-1,4-benzoquinone in 50 parts of acetone was stirred while 10 parts of water was added followed by a solution of 2.0 parts of sodium hydrosulfite in 10 parts of water. The resulting colorless solution was evaporated to about one-third its original volume and then poured into 100 parts of water. The white solid that precipitated was collected by filtration, dried, and sublimed at 75° C. under a pressure corresponding to about 1 mm. of mercury. Crystallization of the sublimate from cyclohexane (30 parts solvent for each part of solute) gave 2,6-bis(trifluoromethylthio)-1,4-hydroquinone as colorless needles, M.P. 66–67° C.

*Analysis.*—Calcd. for $C_8H_4F_6S_2O_2$: F, 36.8%; S, 20.7%. Found: F, 36.4%; S, 20.8%.

Example IV

A spherical glass reactor equipped with efficient stirring means, a gas inlet tube, a rubber septum for catalyst injection, and an efficient solid carbon dioxide/acetone reflux condenser was charged with 88 parts of 2,6-bis(trifluoromethylthio)-1,4-benzoquinone and about 375 parts of chloroform. The reactor and the charged mixture were cooled in an external ice/salt/water bath and 32 parts of pure trifluoromethyl mercaptan were distilled in through the gas inlet tube. Then with vigorous stirring about two parts (about 8.5% based on the benzoquinone) of pyridine catalyst were injected into the reaction mixture all at once. The reaction was immediate as evidenced by rapid dissolution of the quinone with a color change from yellow-orange to amber. The solution was stirred for two hours at room temperature and then washed by extraction with two 125-part portions of 7% aqueous hydrochloric acid and finally dried over anhydrous magnesium sulfate. The chloroform was removed by distillation under reduced pressure, and the resultant oily residue was purified by distillation in a molecular still at a pot temperature of 70–75° C. under a pressure corresponding to 0.08 mm. of mercury. There was thus obtained 2,3,5-tris(trifluoromethylthio)-1,4-hydroquinone as a light yellow oil. An analytical sample, boiling at 64° C. under a pressure corresponding to 0.30 mm. of mercury, was obtained by distillation through an 18″ spinning band column (U.S. Patent 2,712,520).

*Analysis.*—Calcd. for $C_9H_3F_9S_3O_2$: C, 26.3%; H, 0.7%. Found: C, 26.4%; H, 0.8%.

Example V

A solution of 106 parts of 2,3,5-tris(trifluoromethylthio)-1,4-hydroquinone in 200 parts of methylene chloride was slurried with 20 parts of anhydrous magnesium sulfate in a reactor fitted with stirring means and cooled with an external ice/water bath. A solution of about 12 parts of dinitrogen tetroxide in 25 parts of methylene chloride was added dropwise with stirring until effervescence ceased. The resulting dark mixture was stirred for 10 minutes longer and then filtered. The methylene chloride solvent was then removed by distillation under reduced pressure at temperatures not exceeding 60° C., thereby affording 105 parts (100% of theory) of crude 2,3,5-tris(trifluoromethylthio)-1,4-benzoquinone as an orange-red oil. An analytical sample was obtained by distillation in a molecular still at a pot temperature of 80° C. under a pressure corresponding to 0.6 mm. of mercury affording a yellow-red oil that gradually crystallized into an orange solid melting at 29–30° C.

*Analysis.*—Calcd. for $C_9HF_9S_3O_2$: C, 26.5%; H, 0.2%. Found: C, 26.8%; H, 0.3%.

Example VI

As in Example IV to a cold slurry of 94 parts of the above 2,3,5-tris(trifluoromethylthio)-1,4-benzoquinone in 168 parts of chloroform was added 30 parts of pure trifluoromethyl mercaptan and 21 parts (1.12 molar proportions) of pyridine were injected in four portions over a period of about four minutes. The mixture was stirred at room temperature and then poured into excess ice water containing 42 parts of concentrated hydrochloric acid. The aqueous mixture was stirred vigorously and the resultant precipitate was collected by filtration, washed with 5% aqueous hydrochloric acid, and air dried. There was thus obtained 69 parts of crude 2,3,5,6-tetrakis-(trifluoromethylthio)-1,4-hydroquinone as colorless crystals melting at 90–100° C. The chloroform portion of the aqueous filtrate was separated, washed with 10% aqueous hydrochloric acid, and the chloroform removed therefrom by evaporation under reduced pressure. The resultant dark red solid was extracted with 200 parts of boiling n-hexane, from which on cooling an additional crop of the hydroquinone, weighing 27 parts and melting at 99–100° C., was obtained. The total yield of crude 2,3,5,6-tetrakis(trifluoromethylthio)-1,4-hydroquinone was thus 96 parts (82% of theory). An analytical sample was prepared by two additional recrystallizations from n-hexane, followed by sublimation at 95° C. under a pressure corresponding to 0.1 mm. of mercury. The pure product was obtained as colorless crystals melting at 105–106° C.

*Analysis.*—Calcd. for $C_{10}H_2F_{12}S_4O_2$: C, 23.6%; H, 0.4%; S, 25.1%. Found: C, 23.6%; H, 0.6%; S, 25.2%.

Example VII

A suspension of 10 parts of anhydrous magnesium sulfate in a solution of 30 parts of 2,3,5,6-tetrakis(trifluoromethylthio)-1,4-hydroquinone in 200 parts of methylene chloride was stirred and cooled with an external ice/water bath while a solution of about 10 parts of dinitrogen tetroxide in 20 parts of methylene chloride was added dropwise until effervescence ceased. Evaporation of the methylene chloride solvent under reduced pressure gave 29 parts (97% of theory) of crude 2,3,5,6-tetrakis(trifluoromethylthio)-1,4-benzoquinone as an orange solid.

The 2,3,5,6 - tetrakis(trifluoromethylthio) - 1,4 - benzoquinone was purified by sublimation at 67° C. under a pressure corresponding to 0.1 mm. of mercury giving beautiful orange cubes melting at 57.0–58.5° C.

*Analysis.*—Calcd. for $C_{10}F_{12}S_4O_2$: C, 23.6%; H, 0.0%; F, 44.8%; S, 25.2%. Found: C, 23.7%; H, 0.1%; F, 44.9%; S, 25.3%.

Polarographic reduction showed a redox potential close to that of chloranil. Thus, in acetonitrile with lithium perchlorate-supporting electrolyte, a single two-electron reduction occurred at 0.23 volt, as measured against a standard calomel electrode. With pyrene, in benzene solution, the 2,3,5,6-tetrakis(trifluoromethylthio)-1,4-benzoquinone formed a complex exhibiting $\lambda_{max.}=700$ m$\mu$, extinction=480, and an association constant of 18. Reaction with a solution of tetrakis(n-hexyl)ammonium iodide in benzene formed the dark green anion radical of the quinone.

Example VIII

To a solution of 10 parts of crude 2,3,5,6-tetrakis(trifluoromethylthio)1,4-hydroquinone (M.P. 99–100° C.) in 50 parts of water containing 2.4 parts of sodium hydroxide was added dropwise with vigorous stirring 7.6 parts of dimethyl sulfate over a period of five minutes. The reaction mixture was then heated slowly to 95–100° C., and a solution of 2.4 parts of sodium hydroxide in 12 parts of water was added, followed by 7.7 parts of dimethyl sulfate. Ten minutes later, while the solution was still at 95–100° C., an additional solution of 2.4 parts of sodium hydroxide in 12 parts of water and 1.5 parts of dimethyl sulfate were added. The mixture was heated at the reflux for 20 minutes, cooled to 25° C., made alkaline with 10% aqueous sodium hydroxide solution, and filtered. The resultant solid was sublimed at 95–100° C. under a pressure corresponding to 0.1 mm. of mercury, affording 11.5 parts of crude 1,4-dimethoxy-2,3,5,6-tetrakis(trifluoromethylthio)benzene. Recrystallization from cyclohexane afforded 8.0 parts (75% of theory) of pure 1,4-dimethoxy-2,3,5,6 - tetrakis(trifluoromethylthio)benzene as colorless needles melting at 128.5–130.0° C.

*Analysis.*—Calcd. for $C_{12}H_6F_{12}S_4O_2$: C, 26.7%; H, 1.1%; F, 42.3%. Found: C, 26.6%; H, 0.9%; F, 42.3%.

Example IX

A mixture of 5.1 parts of 2,3,5,6-tetrakis(trifluoromethylthio)-1,4-hydroquinone and 5.9 parts of freshly distilled diethyl sulfate in 50 parts of acetone was heated at the reflux and stirred with 10 parts of anhydrous sodium carbonate for 18 hours. The reaction mixture was filtered and the filter cake washed with about 25 parts of actone. The combined acetone filtrates were evaporated to dryness and the solid residue was taken up in about 100 parts of diethyl ether. The ether solution was washed with three 25-part portions of 5% aqueous sodium hydroxide and finally dried over anhydrous magnesium sulfate. The diethyl ether solvent was removed by evaporation, and the resulting solid was crystallized from methanol, affording 3.63 parts (63% of theory) of 1,4-diethoxy - 2,3,5,6 - tetrakis(trifluoromethylthio)benzene melting at 90.1–90.6° C. An analytical sample, melting at 91.0–92.0° C., was prepared by sublimation at 80° C. under a pressure corresponding to 0.1 mm. of mercury.

*Analysis.*—Calcd. for $C_{14}H_{10}F_{12}O_2S_4$: C, 29.8%; H, 1.8%. Found: C, 29.8%; H, 1.9%.

Example X

To a solution of 10.5 parts of 2,6-bis(trifluoromethylthio)-4-methoxyphenol in 40 parts of 1 N aqueous sodium hydroxide solution was added 4.5 parts of dimethyl sulfate, and the resulting mixture was heated at the reflux for 15 minutes. An additional 40 parts of 1 N aqueous sodium hydroxide and 45 parts of dimethyl sulfate were added, and the reaction mixture was heated at the reflux for an additional half hour. The mixture was cooled to room temperature, heated with an additional 20 parts of 1 N aqueous sodium hydroxide, and then extracted with two 100-part portions of diethyl ether. Fractional distillation of the ethereal extract afforded 8.22 parts (75% of theory) of 1,4-dimethoxy-2,6-bis(trifluoromethylthio)benzene as a colorless, mobile liquid boiling at 60° C. under a pressure corresponding to 0.08 mm. of mercury.

*Analysis.*—Calcd. for $C_{10}H_8F_6S_2O_2$: F, 33.7%. Found: F, 33.4%.

Example XI

A mixture of 5.1 parts of 2,3,5,6-tetrakis(trifluoromethylthio)-1,4-hydroquinone, 10 parts of anhydrous sodium carbonate, two parts of sodium iodide, 8.6 parts of benzyl bromide, and about 120 parts of acetone was heated at the reflux for 24 hours. The reaction mixture was then allowed to cool to room temperature, filtered, and the filtrate evaporated to dryness under reduced pressure. The resultant solid was triturated with two approximately 12-part portions of petroleum ether of the 30–60° C. boiling range. After drying, there was thus obtained 6.69 parts of solid product which was taken up in about 350 parts of diethyl ether. The resultant soution was extracted with three 50-part portions of 5% aqueous sodium hydroxide. The ethereal solution was dried over anhydrous magnesium sulfate and the ether removed by evaporation. The resultant solid residue was crystallized from cyclohexane thereby affording, after filtration and drying, 5.5 parts (80% of theory) of 1,4-bis(benzyloxy)-2,3,5,6-tetrakis (trifluoromethylthio)benzene as colorless crystals melting at 146.0–147.0° C. The infrared spectrum of the product shows the absence of the hydroxyl group.

*Analysis.*—Calcd. for $C_{24}H_{14}F_{12}S_4O_2$: C, 41.7%; H, 2.0%. Found: C, 41.9%; H, 2.1%.

Oxidation at room temperature with a solution of $CrO_3$ in 90% nitric acid was vigorous, affording 2,3,5,6-tetrakis(trifluoromethylthio)-1,4-benzoquinone.

Example XII

About 10 parts of acetic anhydride was added in one portion to a solution of 0.50 part of 2,3,5,6-tetrakis(trifluoromethylthio)-1,4-hydroquinone in about two parts of 1.0 N aqueous sodium hydroxide solution, and the resulting mixture was warmed gently at steam bath temperatures until it became colorless. An additional 1.0 part of the 1.0 N aqueous sodium hydroxide solution was added and the resultant mixture heated for about five minutes longer. The reaction mixture was then cooled in an ice/water bath and the resultant colorless solid was removed by filtration and washed with water. Recrystallization from cyclohexane afforded about 0.2 part of 1,4-bis(acetoxy)-2,3,5,6-tetrakis(trifluoromethylthio)benzene as colorless needles melting at 131–133° C.

*Analysis.*—Calcd. for $C_{14}H_6F_{12}S_4O_4$: C, 28.3%; H, 1.0%; S, 21.6%. Found: C, 28.4%; H, 1.2%; S, 21.8%.

Infrared analysis showed the absence of hydroxyl absorption and the presence of a band at 1780 cm.$^{-1}$ assignable to acetate carbonyl.

Example XIII

A mixture of 0.53 part of 2,3,5,6-tetrakis(trifluoromethylthio)-1,4-hydroquinone and about five parts of trifluoroacetic acid anhydride was heated in a sealed, thick-walled, glass pressure tube for eight hours at 125° C. The tube was cooled, opened to atmospheric pressure, and the reaction mixture removed. Evaporation of the crude reaction mixture to dryness under reduced pressure at room temperature afforded 0.71 part of a white, crystalline solid melting at 75–76° C. Recrystallization from n-hexane afforded the pure 1,4-bis-(trifluoroacetoxy)-2,3,5,6-tetrakis(trifluoromethylthio)benzene as colorless needles. Infrared analysis showed the absence of bands attributable to the hydroxyl group and the presence of a band at 1820 cm.$^{-1}$ ascribable to the carbonyl group of the trifluoroacetoxy function.

*Analysis.*—Calcd. for $C_{14}F_{18}S_4O_4$: C, 24.0%; H, 0.0%. Found: C, 24.3%; H, 0.4%.

As stated in the foregoing, the present invention is generic to perfluorohydrocarbylthio, preferably perfluoroalkylthio, substituted 1,4-benzoquinones and the corresponding 1,4-hydroquinones and 1,4-hydroquinone esters and ethers. These new products can carry on the four ring carbons not singly bound or doubly bound with oxygen, i.e., the 2-, 3-, 5-, and 6-carbons, from one to four perfluorohydrocarbylthio radicals, which preferably are perfluoro lower alkylthio radicals, especially those of no more than three carbons. These lower perfluoroalkylthio-substituted hydroquinones, hydroquinone ethers, hydroquinone esters, and quinones can be readily prepared from the corresponding hydroquinones or hydroquinone monoethers or monoesters (followed by oxidation to the corresponding quinones) by direct metathesis with the requisite perfluorohydrocarbonsulfenyl halide or mercaptan.

Thus, the desired 1,4-hydroquinone monohydrocarbyl ether and/or monoester on condensation with the requisite molar proportions of the desired perfluorohydrocarbonsulfenyl halide in the presence of molar proportions of an organic base and usually with an inert solvent will result in the formation of the desired mono- or bis-substituted perfluorohydrocarbylthio-1,4-hydroquinone monoether or monoester in accord with the following stoichiometry

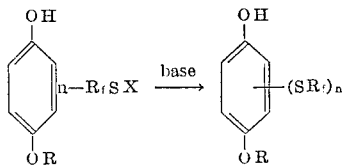

In such preparations any ether group, R, will normally be hydrocarbon and most preferably will be lower alkyl hydrocarbon of generally no more than four carbons. The $R_f$ representing a perfluorohydrocarbon group will generally be lower alkyl of no more than three carbons such as $C_2F_5$—, $C_3F_7$—, $iC_3F_7$—, and the like; and n is an integer from 1–2, inclusive. The necessary base must be used in at least molar proportions for each perfluorohydrocarbon-thio group inserted into the ring, and generally will be used in excess thereof. The most typical such bases are the organic amines such as trimethylamine, triethylamine, pyridine, and the like. The metathetical reaction between the hydroquinone half ethers and the requisite perfluorohydrocarbonsulfenyl halides will normally be carried out in excess quantities of an inert organic solvent such as diethyl ether, tetrahydrofuran, benzene, chloroform, and the like. The latter is particularly preferred when the base being used is pyridine since it serves as a solvent for the pyridine salts of the hydrohalide corresponding to the sulfenyl halide and the like. This metathetical reaction will normally be carried out at temperatures in the range from $-10$ to $+100°$ C. The most convenient operating temperatures are generally in the range of about $0°$ C.

The just-described mono- or diperfluorohydrocarbylmercapto-substituted 1,4-hydroquinone monohydrocarbyl ethers can be directly converted to the corresponding 1,4-quinones by simple direct oxidation. Normally the oxidation will be carried out with such conventional oxidizing agents as aqueous nitric acid, aqueous chromic acid, or the like, usually at temperatures in the range 0–60° C. Conversely, the thus-obtained mono- or diperfluorocarbonmercapto substituted 1,4-benzoquinones can be directly converted to the corresponding hydroquinones by direct chemical reduction. Suitable reducing agents include the $SO_3/H_2O$ system, e.g., from $NaHSO_3$ and aqueous HCl, $Na_2S_2O_4$ and $H_2O$, $NaBH_4$ and $H_2O$, and the like.

The bis(perfluorohydrocarbonmercapto - substituted)-1, 4-benzoquinones can be converted to the desired tris-(perfluorohydrocarbonmercapto - substituted) - 1,4-hydroquinones by direct reaction of the disubstituted-1,4-benzoquinone and the requisite perfluorohydrocarbon mercaptan, generally of no more than three carbons, using an inert solvent and catalytic amounts of an organic base usually present in less than two molar quantities, e.g., primary, secondary, or tertiary amines, alkoxides, hydroxides, and the like. This reaction will normally be carried out at temperatures in the range $-25$ to $+50°$ C. usually in the presence of an inert solvent such as chloroform, methylene dichloride, benzene, diethyl ether, and the like. The thus-obtained tris - (perfluorohydrocarbonmercapto-substituted) 1,4-hydroquinones can be converted to the corresponding tris(perfluorocarbylmercapto - substituted) 1,4-quinones by direct chemical oxidation using conventional oxidizing agents such as $N_2O_4$ or other agents such as nitric acid, chromic acid, and the like, normally at temperatures in the range from 25° C. to 100° C. and inert organic solvents such as methylene dichloride, chloroform, or benzene, or in aqueous systems if desired.

The thus-obtained tris-(perfluorohydrocarbonmercapto-substituted) 1,4-benzoquinones can be converted directly to the desired tetrakis(perfluorohydrocarbonmercapto-substituted) 1,4-hydroquinones by similar direct metathesis with the requisite perfluoro lower alkyl mercaptan, again in the presence of molar quantities of a suitable base, i.e., proton acceptor, in the same inert diluents and in the same temperature range. Similarly speaking, the thus-obtained tetrakis(perfluorohydrocarbonmercapto) 1, 4-hydroquinones can be directly converted to the desired tetrakis(perfluorohydrocarbonmercapto) - 1,4 - benzoquinones by direct chemical oxidation as before. Any or all of the mono-, di-, tris-, or tetra(perfluorohydrocarbonmercapto)-1,4-hydroquinones can be directly converted to the corresponding 1,4-hydroquinone mono- or diether by direct alkylation with the required lower alkyl alkylating agent such as the alkyl bromides, chlorides, iodides, sulfates, p-toluenesulfonates, and the like, normally in the presence of a base such as sodium carbonate in acetone, sodium hydroxide in water, or the like, at temperatures from 25° C. to the reflux temperature of the inert organic diluent being used similar to those just discussed above.

More specifically, addition of chlorine gas to a solution of bis(perfluoro-1-propanethio)mercury (Haszeldine and Kidd, J. Chem. Soc. 1955, 3871) at a low temperature ranging from $-10°$ to $-30°$ C. affords perfluoro-1-propanesulfenyl chloride. After purification of the sulfenyl chloride by distillation, two molar equivalents are added to a solution of slightly less than one molar equivalent of 4-methoxyphenol in the presence of slightly more than three molar equivalents of a proton acceptor such as pyridine. When the reaction mixture is processed in the manner of Example I, 2,6-bis(perfluoro-1'-propylthio)-4-methoxyphenol is isolated as a colorless solid. Oxidation of this phenol, preferably with concentrated nitric acid in the manner of Example II, gives the orange-colored 2,6 - bis(perfluoro-1'-propylthio)-p-benzoquinone. Reduction of an acetone-water solution of this quinone with a reducing agent such as sodium hydrosulfite gives colorless 2,6 - bis(perfluoro-1'-propylthio) - 1,4-hydroquinone. Perfluoro-1-propanethiol (Haszeldine and Kidd, J. Chem. Soc. 1955, 3871) can then be added to 2,6-bis(perfluoro-1'-propylthio)-p-benzoquinone in the manner of Example IV using less-than-molar quantities of a proton acceptor such as pyridine or trimethylamine. The crude 2,3,5-tris-(perfluoro-1'-propylthio)-1,4-hydroquinone so obtained is purified by the usual techniques of organic chemistry, i.e., distillation and/or crystallization, and then oxidized to the corresponding 2,3,5 - tris(perfluoro-1'-propylthio)-p-benzoquinone, for example in the manner of Example V. When slightly more than one molar equivalent of perfluoro-1-propanethiol is added to a solution of this quinone in a solvent such as $CHCl_3$ in the presence of one molar equivalent of an organic base such as pyridine, there is obtained 1,4-dihydroxy-2,3,5,6-tetrakis(perfluoro-1'-propylthio)benzene, purified by the usual techniques of organic chemistry, for example as in the manner of Example VI. Oxidation of this hydroquinone to 2,3,5,6-tetrakis(perfluoro-1′-propylthio)-p-benzoquinone is easily accomplished, for example in the manner of Example VII using $N_2O_4$. The hydroquinone compounds, i.e., the bis-, tris-, and tetrakis-(perfluoro-1′-propylthio)-1,4-hydroquinones can be converted to the corresponding bis alkyl, aryl, aralkyl, alkaryl, cycloalkyl, hydrocarbyl monoacyl or perfluorohydrocarbyl monoacyl derivatives by treatment with appropriate reagents, e.g., in the manner of Examples VIII, IX, X, XI, XII, or XIII. More specifically, 1,4-diethoxy-2,6-bis(perfluoro-1′-propylthio)benzene can be prepared for example by boiling an acetone solution of 2,6-bis(perfluoro-1′-propylthio)-1,4-hydroquinone with two molar equivalents of diethyl sulfate in the presence of excess sodium carbonate. The crude reaction mixture is poured into water, and the inorganic layer separated. Washing the organic layer with 5% caustic solution gives, after evaporation of solvent, pure 1,4-diethoxy-2,6-bis(perfluoro-1′-propylthio)benzene. Heating 2,3,5-tris-(perfluoro-1′-propylthio)-1,4-hydroquinone with propionic anhydride containing a trace of sulfuric acid as catalyst, gives on cooling a colorless solid 1,4-bispropionoxy-2,3,5-tris(perfluoro-1′-propylthio)benzene. Heating 2,3,5,6-tetrakis(perfluoro-1′-propylthio)1,4-hydroquinone in a sealed tube at 110° C. for about three hours with excess perfluoropropionic anhydride (Husted and Ahlbrecht, J. Am. Chem. Soc. 75, 1605 (1953)) gives, after evaporation of the excess perfluoropropionic anhydride under reduced pressure, a colorless, waxy solid 1,4-bis(perfluoropropionoxy)-2,3,5,6-tetrakis(perfluoro-1′-propylthio)benzene.

These now 2-mono-, 2,6-bis-, 2,3,5-tris-, and/or 2,3,5,6-tetrakis(perfluoroalkylthio)benzoquinones and the corresponding hydroquinones and hydroquinone ethers and hydrocarbon esters are useful as high-energy fuels, e.g., as rocket propellants and the like. More specifically, when they are intimately mixed with equal weights of finely powdered potassium perchlorate, packed into 2/16″ diameter copper tubes closed at one end only and suspended by a length of string, and the chemical charge ignited, a vigorous reaction ensues which is accompanied by such a rapid evolution of gas that the copper tubes are propelled in the manner of a rocket. In the order of increasing effectiveness, some compounds which have been demonstrated to be useful as rocket propellants are as follows: 2,3,5,6-tetrakis(trifluoromethylthio)-1,4-hydroquinone (Example VII); 1,4-bis(acetoxy)-2,3,5,6-tetrakis(trifluoromethylthio)-1,4-hydroquinone (Example XII); 1,4-diethoxy-2,3,5,6-tetrakis(trifluoromethylthio)benzene (Example IX); 1,4-bis(benzyloxy)-2,3,5,6-tetrakis(trifluoromethylthio)benzene (Example XI).

These new 2-mono-, 2,6-bis-, 2,3,5-tris-, and 2,3,5,6-tetrakis(perfluoroalkylthio)benzoquinones are surprisingly strong Pi acids. For example, the quinone of Example VII forms a 1:1 complex with pyrene in dichloromethane having an absorption maximum of 700 m$\mu$ ($\epsilon$=480) and an association constant of 18.0. Chloranil forms a 1:1 complex with pyrene having $\lambda_{max}$. 610 m$\mu$ ($\epsilon$=940) and an association constant of 23.

The above 2-mono-, 2,6-bis-, 2,3,5-tris-, and 2,3,5,6-tetrakis(perfluoroalkylthio)benzoquinones are strong oxidizing agents. For example, the quinone of Example VII is reduced by iodide ion to the corresponding ion radical. Polarographic reduction of the quinone from Example V (in $CH_3CN$ with $Bu_4NClO_4$) shows a one-electron reduction wave at $E_{1/2}$=0.14 v. (vs. SCE). This is comparable to the reduction potential of trichloro-p-benzoquinone. Likewise polarographic reduction of the quinone from Example VII (in $CH_3CN$ with $LiClO_4$ electrolyte) shows a reduction at $E_{1/2}$=0.23 v. (vs. SCE), which is slightly greater than the $E_{1/2}$ observed for chloranil under the same conditions.

The present 2-mono1, 2,6-bis-, 2,3,5-tris-, and 2,3,5,6-tetrakis(perfluoroalkylthio)benzoquinones are useful as free-radical polymerization inhibitors, i.e., inhibitors of free radical-initiated and propagated polymerization of ethylenically unsaturated, addition polymerizable compounds. These perfluoroalkylthio-substituted 1,4-benzoquinones, because of their high oxidation potential, are useful for dehydrogenating organic molecules. These quinones are particularly outstanding as chemical dehydrogenation agents in that the reaction can be effected at comparatively low temperatures. Thus, there can be avoided the thermal rearrangements and adverse effects on reactive chemical groups so often encountered in chemical dehydrogenation reactions with sulfur, selenium, and the like which normally only function at relatively elevated temperatures—see, for instance, Mayer et al., Ber. 67, 67 (1934). These new perfluoroalkylthio-substituted-1,4-benzoquinones are particularly outstanding in this chemical dehydrogenation use since they not only function as efficiently as chloranil or other quinones with high oxidation potentials—see, for instance, Arnold et al., J. Am. Chem. Soc., 62, 983 (1940)—but have the further advantage of being much more soluble in conventional organic media used in effecting such chemical dehydrogenation reactions and, accordingly, are more convenient and easier to use than the other quinones.

These perfluoroalkylthio-substituted-1,4-benzoquinones are specially useful for the dehydrogenation of certain steroids having hydroaromatic rings, e.g., in the manner of Agnello et al., J. Am. Chem. Soc., 79, 1257 (1957), and also Graber et al., J. Org. Chem., 26, 4774 (1961).

These new 2-mono-, 2,6-bis-, 2,3,5-tris-, and 2,3,5,6-tetrakis(perfluoroalkylthio)-1,4-hydroquinones and the corresponding 1,4-hydroquinone hydrocarbyl ethers and 1,4-hydroquinone hydrocarbyl monoacyl and perfluorohydrocarbyl monoacyl esters are useful as oxidation inhibitors. Because of their high volatility, these perfluoroalkylthio-substituted-1,4-benzoquinones are especially useful as inhibitors of vapor-phase oxidation. Thus, because of high solubility and high volatility, these perfluoroalkylthio-substituted-1,4-benzoquinones can be added in solution to the material which is to be protected from oxidation and serve to inhibit oxidation in the liquid phase and at the same time to inhibit oxidation in the vapor phase.

More specifically, the 2,6-bis(trifluoromethylthio)-1,4-hydroquinone of Example III, the 2,6-bis-(trifluoromethylthio)-1-hydroxy-4-methoxybenzene of Example I, and the 2,6-bis(trifluoromethylthio)-1,4-benzoquinone of Example II, when tested in a conventional gasoline antioxidant test exhibited, respectively, 12.9%, 9.6%, and 7.0% of the efficiency of the standard gasoline antioxidant No. 22, i.e., N,N-disecondary butyl-p-phenylenediamine.

The above thirteen examples illustrate specific embodiments of the new class of perfluorocarbylthiobenzoquinones and corresponding hydroquinones and hydroquinone ethers and esters of this invention. Also included as part of the present invention are the corresponding and related sulfoxy and sulfonyl perfluorocarbylquinones, -hydroquinones, and ester and/or ether derivatives of the said hydroquinones. These additional compounds can be represented by the following formulas:

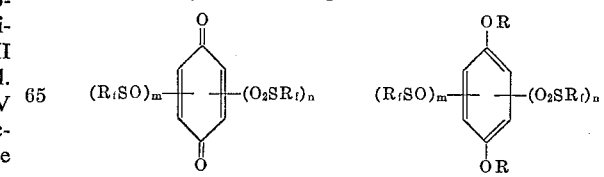

wherein the R′s and $R_f$'s have their previous significance and $m$ and $n$ are each integers between 0 and 4, with the further proviso that the sum of $m+n$ cannot exceed 4 and cannot be less than 1. These sulfoxy (—SO—) and sulfonyl (—$SO_2$—) derivatives are illustrated in further detail by the following five examples, in which the parts given are again by weight.

Example XIV

A mixture of 18 parts of chromium trioxide in about 265 parts of fuming (90%) nitric acid was stirred in a glass reactor and held at 0–10° C. by application of an external ice/water bath. An 18.2-part charge of finely powdered 1,4 - dimethoxy-2,3,5,6-tetrakis(trifluoromethylthio)-benzene of Example VIII was added all at once, and the reaction mixture was stirred overnight, during which time the ice in the cooling bath was allowed to melt and the reaction mixture accordingly warmed spontaneously to room temperature. To the resulting dark green, homogeneous solution was added an additional 18 parts of chromium trioxide, and the stirred reaction mixture was then heated slowly over a period of one hour to 50° C., held at that temperature for one hour, then heated to 60° C. over a period of 15 minutes, and finally maintained at that temperature for one hour. The dark green reaction mixture was then cooled to 15° C. and poured into excess ice water. The resulting bright yellow solid product was removed by filtration, washed with water, and dried in air. There was thus obtained 21.2 parts of 1,4-dimethoxy-2,3,5,6 - tetrakis(trifluoromethylsulfonyl) - benzene. Recrystallization from about 450 parts of benzene afforded 13.6 parts (60% of theory) of pure 1,4-dimethoxy-2,3,5,6-tetrakis(trifluoromethylsulfonyl)benzene as bright yellow crystals melting at 214.0–215.0° C. An analytical sample exhibiting the same melting point was prepared by sublimation at 100° C. under a pressure corresponding to 0.1 mm. of mercury.

*Analysis.*—Calcd. for $C_{12}H_6F_{12}S_4O_{10}$: C, 21.6%; H, 0.9%; F, 34.2%; S, 19.2%. Found: C, 21.8%; H, 1.0%; F, 34.2%; S, 19.3%.

The above tetrasulfone is remarkable in that it is a stronger oxidizing agent than chloranil, which is quite unusual for a wholly aromatic compound. Likewise quite surprisingly, the aromatic tetrasulfone reacts with tetrakis-n-hexylammonium iodide in benzene solution to form a transient dark green anion radical exhibiting a 13-line e-p-r spectrum.

Example XV

A suspension of 0.666 part of the above 1,4-dimethoxy-2,3,5,6-tetrakis(trifluoromethylsulfonyl)benzene of Example XIV and 0.10 part of 10% palladium-on-charcoal catalyst in about 66.8 parts of purified dichloromethane was stirred at 28° C. under about one atmosphere hydrogen pressure. Hydrogen uptake was completed in about one hour, and the resulting colorless solution was filtered and evaporated to dryness. There was thus obtained 0.615 part of crude 1,4-dimethoxytris(trifluoromethylsulfonyl) benzene as a colorless solid melting at 180–181° C. with decomposition. Sublimation of the crude product twice at 140° C. under a pressure corresponding to 0.1 mm. of mercury afforded the pure 1,4-dimethoxytris(trifluoromethylsulfonyl)benzene as colorless crystals melting at 187.5–188.0° C.

*Analysis.*—Calcd. for $C_{11}H_7F_9S_3O_8$: C, 24.7%; H, 1.3%. Found: C, 24.8%; H, 1.2%.

Example XVI

A mixture of 0.5 part of trifluoromethylsulfonyl-1,4-hydroquinone, 1.5 parts of magnesium sulfate, and 2.0 parts of freshly prepared silver oxide was stirred in about 33.4 parts of purified dichloromethane for 15 minutes at room temperature and then filtered through a sintered glass filter under an atmosphere of nitrogen. The filter cake was washed with three approximately 7.5-part portions of anhydrous diethyl ether, and the combined filtrates were evaporated under reduced pressure. The resulting yellow solid was sublimed at 80° C. under a pressure corresponding to 0.1 mm. of mercury. The resultant crystalline sublimate (trifluoromethylsulfonyl-p-benzoquinone) was analyzed under dry-box conditions.

*Analysis.*—Calcd. for $C_7H_3F_3SO_4$: C, 35.0%; H, 1.3%. Found: C, 35.1%; H, 1.5%.

Example XVII

To a solution of freshly prepared trifluoroperacetic acid (by adding 46 parts of trifluoroacetic anhydride to a suspension of about 6.1 parts of 90% hydrogen peroxide in about 200 parts of methylene dichloride cooled in an ice bath) was added dropwise with stirring over a period of one hour a solution of 1,4-dimethoxy-2,6-bis(trifluoromethylthio)-benzene in about 26.7 parts of methylene dichloride. The resulting reaction mixture was stirred at room temperature for 48 hours and then extracted with five approximately 75-part portion of saturated aqueous sodium bicarbonate. The resultant organic raffinate portion was separated and dried over anhydrous magnesium sulfate. Evaporation under reduced pressure afforded 13.3 parts of crude 1,4-dimethoxy-2-trifluoromethylsulfonyl-6-trifluoromethylsulfoxybenzene. Recrystallization from n-hexane afforded 10.73 parts of pure 1,4-dimethoxy-2-trifluoromethylsulfonyl - 6-trifluoromethyl-sulfoxybenze as white crystals melting at 62–74° C. An analytical sample was obtained by sublimation and found to melt at 63–67° C.

*Analysis.*—Calcd. for $C_{10}H_8F_6S_2O_5$: C, 31.1%; H, 2.1%; F, 29.5%; S, 16.7%. Found: S, 31.3%; H, 2.2%; F, 29.4%; S, 16.6%.

Example XVIII

To a solution of 23.7 parts of the above 1,4-dimethoxy-2 - trifluoromethylsulfonyl - 6 - trifluoromethylsulfoxybenzene of Example XVII in about 110 parts of glacial acetic acid was added at room temperature, with vigorous stirring, 10 parts of chromium trioxide. The resultant exothermic reaction was controlled in the reaction vessel to maintain an internal temperature between 55 and 60° C. by suitable application of an external ice/water cooling bath. When the initial exothermic reaction had subsided, an additional ten parts of chromium trioxide was added and the internal reaction temperature was again maintained at 55–60° C. by suitable external cooling. When this exothermic reaction had subsided, the reaction mixture was heated slowly to 100° C. with stirring. This induced another exothermic reaction, and the reaction mixture, under these conditions, was held at 100° C. by suitable periodic removal of the heating source. When this second exothermic reaction had subsided, the reaction mixture was finally heated at 115° C. for 45 minutes with stirring. The resulting reaction mixture was cooled in ice and poured into excess water. The resulting solid was removed by filtration and dried, thereby affording 15.8 parts of crude 1,4 - dimethoxy - 2,6-bis(trifluoromethylsulfonyl)benzene as a colorless solid. After recrystallization from about 75 parts of n-hexane, there was obtained 9.2 parts (37% of theory) of pure 1,4-dimethoxy-2,6-bis(trifluoromethylsulfonyl)-benzene as large prisms melting at 69.5–71.0° C. An analytical sample was prepared by sublimation under reduced pressure.

*Analysis.*—Calcd. for $C_{10}H_8F_6S_2O_6$: C, 28.9%, H, 2.0%; F, 28.4%; S, 16.0%. Found: C, 30.1%; H, 1.9%; F, 28.3%; S, 16.2%.

These new perfluorocarbyl sulfoxy and sulfonyl quinones, hydroquinones, and hydroquinone esters and ethers are, in general, useful for the same purposes as the corresponding and closely related perfluorocarbylthio compounds For example, the perfluorocarbyl sulfoxy and sulfonyl quinones are strong oxidizing agents, like the perfluorocarbylthiobenzoquinones.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the group consisting of

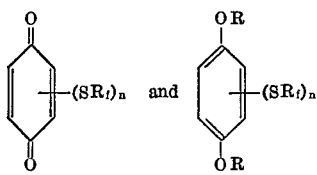

wherein:
R is selected from the group consisting of hydrogen alkyl of up to 4 carbons, benzyl, hydrocarbyl monoacyl of up to 3 carbons and perfluorohydrocarbyl monoacyl of up to 3 carbons;
$R_f$ is perfluoroalkyl of no more than 8 carbons; and
$n$ is an integer from 1 to 4, inclusive, not more than one R being hydrogen when $n$ is 1.

2. A compound of claim 1 wherein R is lower alkyl of no more than 4 carbons, and $R_f$ is lower perfluoroalkyl of 1 to 3 carbons.

3. A compound of the formula

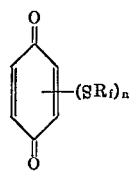

wherein $R_f$ is perfluoroalkyl of no more than 8 carbons and $n$ is an integer from 1 to 4, inclusive.

4. 2-trifluoromethylthio-1,4-benzoquinone.
5. 2,6-bis(trifluoromethylthio)-1,4-benzoquinone.
6. 2,3,5-tris(trifluoromethylthio)-1,4-benzoquinone.
7. 2,3,5,6 - tetrakis(trifluoromethylthio) - 1,4 - benzoquinone.
8. A compound of claim 1 wherein R is hydrogen, and $R_f$ is lower perfluoroalkyl of 1 to 3 carbons.
9. 2,6 - bis(trifluoromethylthio) - 1,4 - hydroquinone.
10. 2,3,5,-tris(trifluoromethylthio)-1,4-hydroquinone.
11. 2,3,5,6 - tetrakis(trifluoromethylthio) - 1,4 - hydroquinone.

12. Process for the preparation of a benzoquinone of the formula

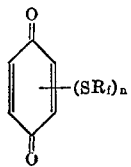

wherein $R_f$ is perfluoroalkyl of no more than 8 carbons, and $n$ is an integer from 2 to 4, inclusive, which comprises reacting, at a temperature in the range from −25 to +50° C. and in the presence of an inert organic solvent selected from the group consisting of chloroform, methylene dichloride, benzene and diethyl ether, a compound of the formula

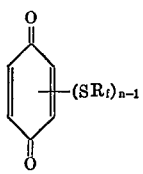

wherein $R_f$ and $n$ are as defined above, with a perfluorohydrocarbon mercaptan, $R_fSH$, wherein $R_f$ is as defined above, in the presence of less than two molar catalytic amounts of an organic base selected from the group consisting of primary, secondary and tertiary amines and alkoxides, thereby forming a compound of the formula

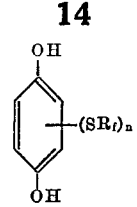

wherein $R_f$ and $n$ are as defined above; and reacting said compound at a temperature in the range from 0 to 60° C., with an oxidizing agent selected from the group consisting of nitric acid, chromic acid and nitrogen tetroxide, thereby forming aforesaid benzoquinone.

13. Process for the preparation of a compound of the formula

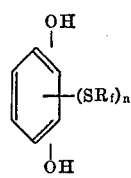

wherein $R_f$ is perfluoroalkyl of no more than 8 carbons, and $n$ is an integer from 2 to 4, inclusive, which comprises reacting, at a temperature in the range from −25 to +50° C. and in the presence of an inert organic solvent selected from the group consisting of chloroform, methylene dichloride, benzene and diethyl ether, a compound of the formula

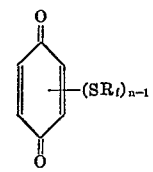

wherein $R_f$ and $n$ are as defined above, with a perfluorohydrocarbon mercaptan, $R_fSH$, wherein $R_f$ is as defined above, in the presence of less than two molar catalytic amounts of an organic base selected from the group consisting of primary, secondary and tertiary amines and alkoxides.

14. A compound of the group consisting of

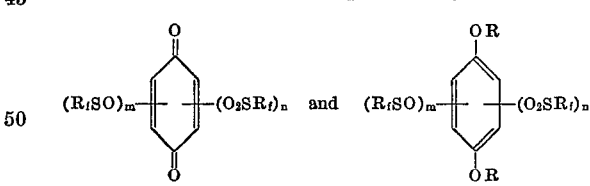

wherein:
R is selected from the group consisting of hydrogen, alkyl of up to 4 carbons, benzyl, hydrocarbyl monoacyl of up to 3 carbons and perfluorohydrocarbyl monoacyl of up to 3 carbons;
$R_f$ is perfluoroalkyl of no more than 8 carbons; and
$m$ and $n$ are each integers from 0 to 4, the sum of $m$ and $n$ being not greater than 4 or less than 1 and not more than one R being hydrogen when the sum is 1.

15. A compound of claim 14 wherein R is lower alkyl of no more than 4 carbons, $R_f$ is lower perfluoroalkyl of 1 to 3 carbons and $m$ is 0.

16. A compound of the formula

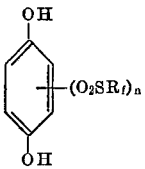

wherein $R_f$ is lower perfluoroalkyl of 1 to 3 carbons and $n$ is an integer from 1 to 4, inclusive.

17. 1,4 - dimethoxy - 2,3,5,6 - tetrakis(trifluoromethylsulfonyl)benzene.

References Cited

UNITED STATES PATENTS

| | | | |
|---|---|---|---|
| 2,862,974 | 12/1958 | Sieglitz | 260—396 X |
| 2,943,097 | 6/1960 | Beachem | 260—396 |
| 3,132,182 | 5/1964 | Richert | 260—609 |

OTHER REFERENCES

Wagner: Syn. Org. Chem., pp. 226–230, 480–483 (1953).

Reid: Organic Chemistry of Bivalent Sulfur, vol. 1, pp. 276–7 (1958).

R. Q. Brewster: Organic Chemistry (1954), Prentice-Hall, Inc., New York, pp. 138 and 139.

LORRAINE A. WEINBERGER, *Primary Examiner.*

L. ZITVER, *Examiner.*

L. A. THAXTON, D. P. CLARKE, *Assistant Examiners.*